A. W. LAWNIN.
AUTOMATIC DRAIN COCK.
APPLICATION FILED MAR. 20, 1911.
1,021,537.
Patented Mar. 26, 1912.
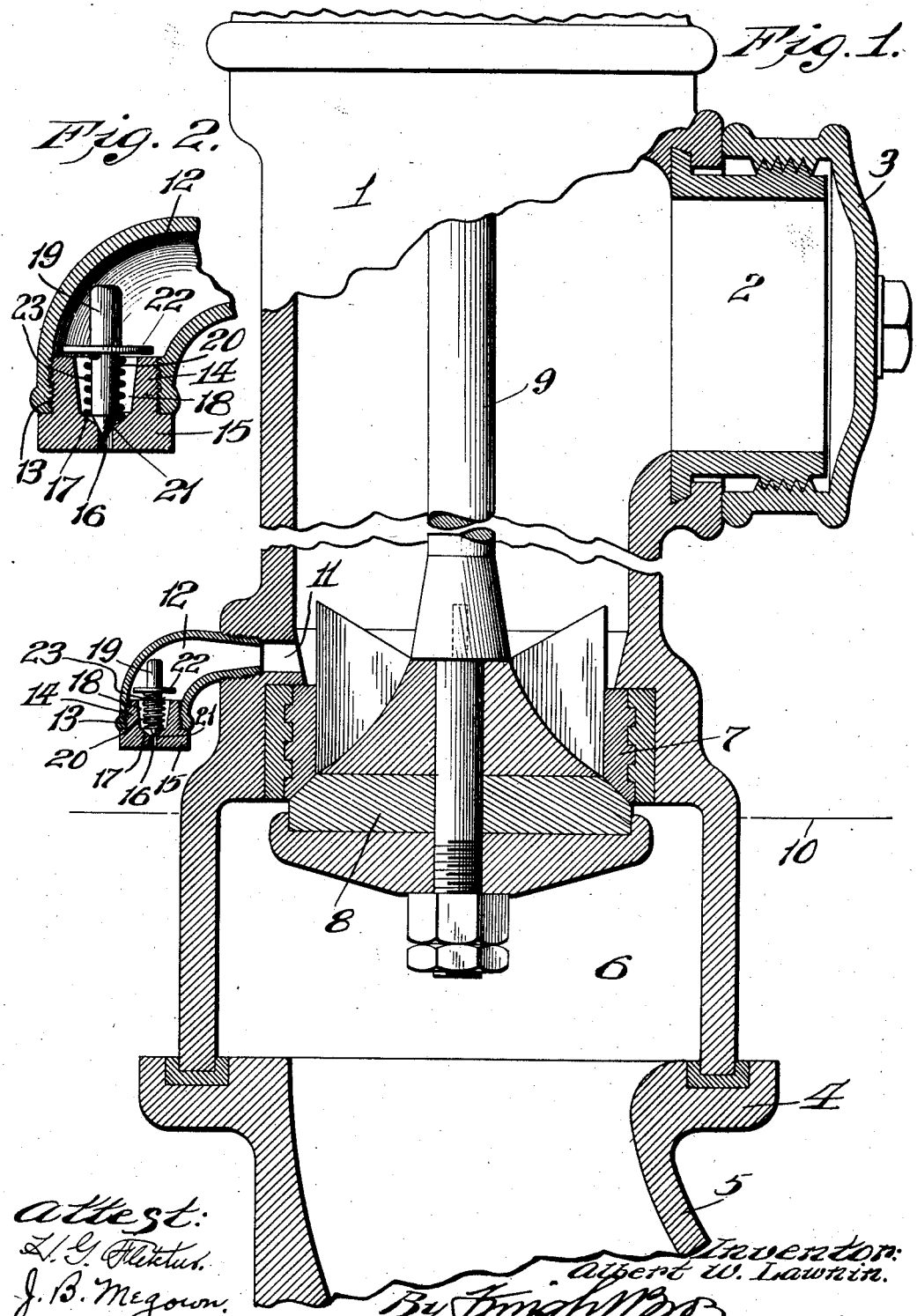

UNITED STATES PATENT OFFICE.

ALBERT W. LAWNIN, OF ST. LOUIS, MISSOURI, ASSIGNOR OF ONE-HALF TO LOUIS D. LAWNIN, OF EDWARDSVILLE, ILLINOIS.

AUTOMATIC DRAIN-COCK.

1,021,537. Specification of Letters Patent. Patented Mar. 26, 1912.

Application filed March 20, 1911. Serial No. 615,480.

*To all whom it may concern:*

Be it known that I, ALBERT W. LAWNIN, a citizen of the United States of America, and a resident of the city of St. Louis, in the State of Missouri, have invented certain new and useful Improvements in Automatic Drain-Cocks, of which the following is a specification.

This invention relates to drain cocks for fire plugs and other similar purposes, and has for its primary object to provide an improved construction, combination and arrangement of parts in devices of this character, by means of which the water, or other fluid, remaining in a stand pipe, or other closed channel, is automatically discharged after the main service flow has been terminated.

One of the objects of the present invention is to provide an improved device of this character which will act automatically to close the drain outlet when the service flow is started, and to open said outlet when the service flow is finished.

Other and further objects will appear in the specification and be specifically pointed out in the appended claims, reference being had to the accompanying drawing exemplifying the invention, and in which—

Figure 1 is a vertical section of a fire plug provided with my improved device, parts being shown in elevation, and parts broken away. Fig. 2 is an enlarged detail section showing the parts in different positions.

Referring more particularly to the drawing, the fire plug, which is of well-known construction, comprises a cylindrical housing 1 with a discharge connection 2 provided exteriorly with screw threads for the reception of a threaded cap 3 for closing said connection when the plug is not in use. The fire plug housing is mounted upon the flanged upper end 4 of a service pipe 5, the lower end of the housing 1 being provided with an enlarged inlet chamber 6, between which and the upper end of the housing 1 is provided a valve seat 7, operatively related to which is a valve 8 moving to and from said valve seat 7 by means of a valve rod 9, in a well-known manner.

In the present embodiment, the ground level is represented by the line 10, so that all water which is retained within the fire plug above the line 10 would be liable to freeze in cold weather. To provide improved means for removing this water automatically constitutes the main general object of this invention. For this purpose, the drain outlet 11 has its outer end threaded to receive an elbow 12 of peculiar construction, said elbow being enlarged outwardly from the outlet 11, and deflected downwardly for the purpose to be presently explained. The outer beaded end 13 of the elbow 12 is threaded interiorly to adapt it to receive a threaded plug 14, provided with a hexagonal flange 15, adapted to be screwed into and out of position in the elbow 12. Said plug is provided with a valve aperture 16, the inner end of which is flared upwardly at 17 into an inwardly enlarging valve retaining receptacle or passage-way 18. Imprisoned within the elbow 12 and plug 14 is a valve 19 whose lower end 20 is provided with a taper of much sharper inclination than the beveled surface 17 of the plug 14, so that said valve has line contact only around the annular seat 21 of the aperture 16. Adjacent its longitudinal center, valve 19 is provided with an annular enlargement or flange 22. Interposed between the flange 22 and the beveled portion 17 of the plug is a helical spring 23 which normally tends to hold the valve 19 in raised position, leaving a passage-way at the bottom for the discharge of water from the stand pipe 1 of the plug.

The upper end of the spring 23 is seated within a recess formed at the corner of the valve 19 and flange 22, so that the spring and valve are held together to obviate the possibility of the valve being displaced from the spring and assuming an incorrect position on its return movement. The tapered opening 18 in the plug 14 serves to center the valve 19 in its return movement, should it be displaced from the position shown in the drawing. Furthermore, the flange 22 limits the inward movement of the valve 20 by engaging the walls of the elbow 12.

The operation of my improved device will now be clearly understood, and briefly stated is as follows: When the fire plug is put into service, the water rushes from the stand pipe 1 through the elbow 12, the momentum of the water serving to exert a pressure on the flange 22 sufficient to overcome the spring 23 and to force the valve 19 into closed position against the seat 21, thus effecting a rapid closure of the valve which is readily retained closed by the water pressure. Then, after the flow of water has ceased and the head in the stand pipe 1 is reduced to the lower edge of the discharge outlet 2, the strength of the spring 23 will be sufficient to raise the valve 19, thereby opening the discharge outlet to permit the stand pipe being thoroughly drained to obviate all danger from freezing. It is to be noted that when the valve is in closed position, the flange 22 is elevated sufficiently far above the upper inner end of the plug 14 to permit the passage of grains of sand, or other grit, which ordinarily work considerable damage to valve seats in devices of similar nature. On the other hand, when the valve is elevated by the spring 23 to release the entrapped water, such sand or grit becomes expelled from the valve aperture 16, the device being therefore adapted to maintain itself free from all injurious sediment.

What I claim is:

1. In a drain cock provided with a downwardly discharging outlet, a valve operatively related to said outlet, said valve being provided with a tapered point adapting it to close said outlet, the inner wall of the cock being beveled to leave a wedge-shaped space between it and the valve, and resilient means mounted on said valve and normally separating said valve from said discharge outlet.

2. In a device of the character described, the combination with a valve housing open at one end, of a plug for said open end, said plug being provided with a contracted aperture and an inwardly enlarged passageway, a valve provided with a tapered point adapted to close said aperture and with a flange extending above and spaced from the inner end of the plug, when the valve is in closed position, and a spring interposed between said flange and the wall of said plug adjacent said aperture.

3. In a device of the character described, the combination with a stand pipe, of a drain cock therefor comprising an outwardly enlarged valve housing, means for closing the outer end of said housing, said means being provided with a central aperture and with an inwardly enlarged passageway leading thereto, a valve reciprocably mounted within said passage-way, said valve being provided with a pointed end adapted to close said aperture so as to leave a wedge-shaped space around the valve, a flange integral with said valve and overhanging the inner end of said passage-way, and resilient means interposed between said flange and said means for closing the outer end of said valve housing.

4. In a device of the character described, the combination with a stand pipe, of a drain cock therefor comprising an elbow, a plug at the lower end of said elbow, said plug being provided with a contracted opening in the outer wall thereof and an inwardly enlarged passage-way leading to said opening, a valve provided with a pointed end reciprocable to and from the inner end of said opening and with a flange, and a spring disposed between the inner end of said opening and said flange; said valve below said flange being of sufficient length to maintain said flange spaced from the inner end of said plug when the valve is in closed position.

ALBERT W. LAWNIN.

In the presence of—
  Chas. R. Gillespie,
  J. B. Megown.

---

Copies of this patent may be obtained for five cents each, by addressing the "Commissioner of Patents, Washington, D. C."